United States Patent [19]

Bayliss et al.

[11] Patent Number: 5,264,078

[45] Date of Patent: Nov. 23, 1993

[54] APPARATUS AND METHOD FOR SPRAY DRYING SOLIDS-LADEN HIGH TEMPERATURE GASES

[75] Inventors: Ronald W. Bayliss, Glyndon, Md.; Karl D. Libsch; Charles H. Washburn, both of Salt Lake City, Utah

[73] Assignee: Aptus Inc., Salt Lake City, Utah

[21] Appl. No.: 726,422

[22] Filed: Jul. 5, 1991

[51] Int. Cl.$^5$ ............................. B01D 1/18
[52] U.S. Cl. ....................... 159/4.08; 34/33; 34/57 A; 34/168; 159/4.03; 159/4.07; 159/48.1; 159/4.02; 202/236; 203/90
[58] Field of Search ............. 159/48.1, 4.03, 16.1, 159/4.07, 4.02, 4.08; 202/236; 203/90; 34/33, 10, 57 A, 57 R, 168, 54; 261/115

[56] References Cited

U.S. PATENT DOCUMENTS

| | | | |
|---|---|---|---|
| 1,648,937 | 11/1927 | Dickerson | 159/4.1 |
| 1,782,054 | 11/1930 | Uhl | 159/48.1 |
| 2,851,097 | 9/1958 | Ledgett | 159/48.1 |
| 3,629,951 | 12/1971 | Davis | 34/33 |
| 3,654,981 | 4/1972 | Aitchison | 159/47.1 |
| 3,788,244 | 1/1974 | Polsak et al. | 55/226 |
| 3,791,108 | 2/1974 | Hausberg et al. | 55/226 |
| 3,805,869 | 4/1974 | Winter et al. | 159/4.01 |
| 3,993,536 | 11/1976 | Kalka et al. | 159/48.1 |
| 4,187,617 | 2/1980 | Becker, Jr. et al. | 159/4.02 |
| 4,253,955 | 3/1981 | Kline | 55/228 |
| 4,261,793 | 4/1981 | Nakamura et al. | 159/48.1 |
| 4,267,131 | 5/1981 | Prudhon et al. | 159/48.1 |
| 4,519,990 | 5/1985 | Bevilaqua et al. | 159/48.1 |
| 4,732,744 | 3/1988 | Chang et al. | 423/235 |
| 4,963,226 | 10/1990 | Chamberlain | 159/48.1 |
| 5,064,501 | 11/1991 | Boersen | 159/48.1 |

FOREIGN PATENT DOCUMENTS

| | | | |
|---|---|---|---|
| 0817429 | 3/1981 | U.S.S.R. | 159/48.1 |
| 0709956 | 6/1954 | United Kingdom | 159/48.1 |
| 1161560 | 8/1969 | United Kingdom | 159/48.1 |
| 9104776 | 4/1991 | World Int. Prop. O. | 159/48.1 |

Primary Examiner—Virginia Manoharan

[57] ABSTRACT

An apparatus for spray drying a mixture of a liquid containing dissolved solids and a high temperature gas containing molten solids employs a gas flow retarding auxiliary chamber upstream of a spray drying main chamber for retarding the rate of flow of gas into the main chamber. The slowed rate of gas flow serves to reduce generation of eddy currents and to distribute the gas flow more uniformly in the main chamber. The apparatus also employs a bi-level atomizing spray nozzle arrangement in the spray drying main chamber for injecting an atomized liquid spray into the gas flow and thereby disrupting the gas flow at both the inlet of and midway through the main chamber. Such disruptions of gas flow provides a more thorough mixing of the gas and sprayed atomized liquid and distributes the gas flow more uniformly across the main chamber and thereby distributes the evaporation and drying of solids from the mixture more uniformly throughout the main chamber.

11 Claims, 3 Drawing Sheets

APPARATUS AND METHOD FOR SPRAY DRYING SOLIDS-LADEN HIGH TEMPERATURE GASES

BACKGROUND OF THE INVENTION

1. Field of the Invention

The present invention relates generally to pollution control equipment and, more particularly, is concerned with an apparatus and method for spray drying solids-laden high temperature gases.

2. Description of the Prior Art

Hazardous waste incinerators and other high temperature furnaces exhaust hot gases laden with flyash. The energy in these hot gases is available to be used in a spray drying apparatus for spray drying liquids containing dissolved solids to produce cooled exhaust gases and dry powder which contains the previously dissolved solids.

Using exhaust gases from these different sources after substantial reduction in the gas temperature is common practice in a spray drying apparatus. It is not conventional practice, however, to have exhaust gases enter the vessel of the spray drying apparatus at very high temperatures under conditions where the exhaust gases may contain molten flyash and where conventional flow distribution devices cannot be used.

Flow distribution within the vessel of the spray drying apparatus is an important factor in spray drying vessel design. Various types of distribution plates, straightening vanes, and similar devices are used to make the velocity profile across the spray drying vessel as uniform as possible. If the gas flow is not uniformly distributed, then partially dried solids will impact the wall of the vessel and build up deposits which will lead eventually to shutdown.

At high temperatures when flyash is present, these flow distribution devices are impractical and inappropriate to use. Metals lose structural strength and are rapidly oxidized. Ceramics are hard to support and fabricate. Both metals and ceramics contain openings which are rapidly clogged with flyash.

Consequently, a need exists to devise other ways to more uniformly distribute the high temperature gas flow in the spray drying vessel.

SUMMARY OF THE INVENTION

The present invention provides a spray drying apparatus and method designed to satisfy the aforementioned needs. The apparatus and method of the present invention for spray drying a mixture of a liquid containing dissolved solids and a high temperature gas containing molten solids, utilize several features for spreading the evaporation process throughout the vessel of the spray drying apparatus, thereby enhancing the completeness of drying attained in the vessel.

One feature incorporated by the spray drying apparatus of the present invention is the combination of a main vessel defining a spray drying main chamber and an auxiliary vessel defining a gas flow rate retarding auxiliary chamber. The auxiliary vessel is connected to a top inlet of the main vessel. The auxiliary chamber has a larger diameter than a gas supply duct connected to an inlet of the auxiliary vessel and a smaller diameter than the main chamber. The auxiliary chamber, being of such size relationships to the duct and main chamber, is capable, without any flow distribution device therein, of retarding or slowing the rate of flow of a high temperature gas from the supply duct through the auxiliary chamber into the main chamber of the main vessel and thereby of causing a more uniform distribution of the gas flow into the main chamber.

Another feature incorporated by the spray drying apparatus of the present invention is a bi-level atomizing spray nozzle arrangement in the main chamber of the main vessel. The bi-level arrangement includes a first plurality of atomizing spray nozzles located adjacent to the top inlet and a second plurality of atomizing spray nozzles located midway between the top inlet and a bottom outlet of the main chamber. The nozzles in the first plurality are aligned in an inclined relation to a generally downward direction of gas flow from the auxiliary chamber to the main chamber, whereas the nozzles in the second plurality are aligned in a transverse relation thereto. The bi-level nozzle arrangement is capable of more uniformly distributing the flow of gas in the main chamber and of spreading the evaporation process throughout the main chamber and thereby of enhancing the completeness of drying attained in the main vessel.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
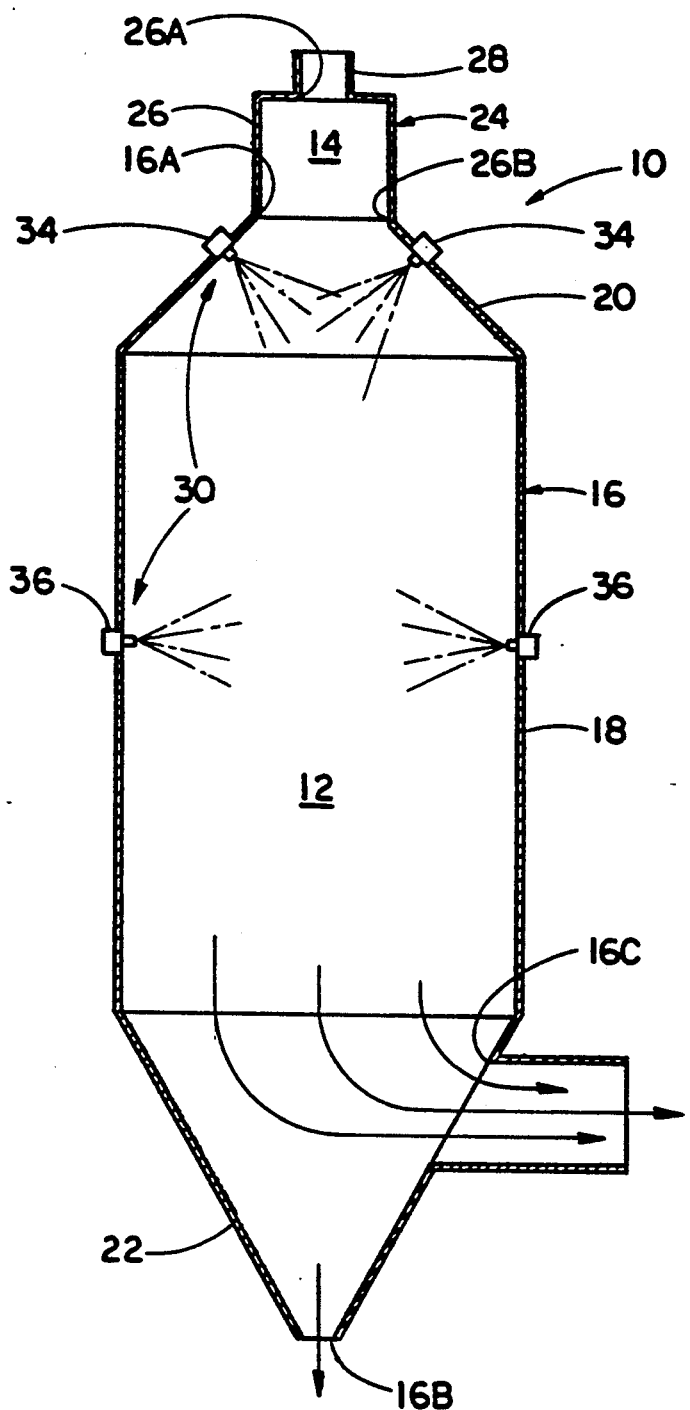
FIG. 1 is a schematic view of a spray drying apparatus in accordance with the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 2:
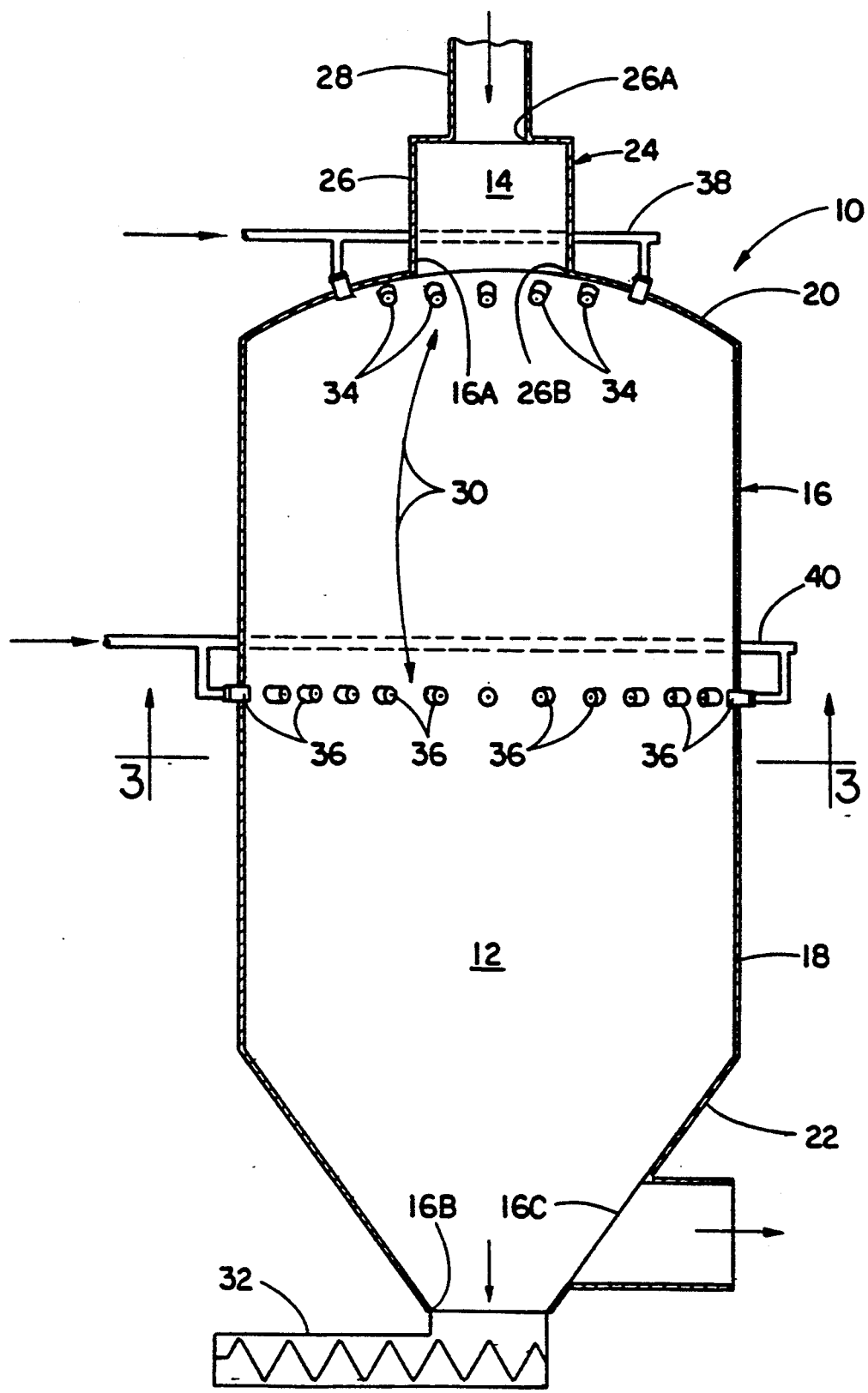
FIG. 2 is a longitudinal sectional view of the spray drying apparatus of FIG. 1.

Referring now to the drawings, and particularly to FIGS. 1 and 2, there is shown an apparatus, generally designated by the numeral 10, for spray drying a mixture of a liquid containing dissolved solids and a high temperature gas containing molten solids. The spray drying apparatus 10 employs several features which together are highly effective for spreading the evaporation process throughout the apparatus 10 and thereby enhancing the completeness of drying attained by the apparatus.

One feature incorporated by the spray drying apparatus 10 of the present invention is the combination of a spray drying main chamber 12 and an auxiliary, or preparatory, gas flow rate retarding auxiliary chamber 14. The main chamber 12 is defined by an elongated main hollow vessel 16 having an upper inlet 16A and separate lower dry solids and gas outlets 16B, 16C communicating with the main chamber 12 which extends between them. More particularly, the elongated main vessel 16 is composed of a generally cylindrical middle wall 18 and upper and lower oppositely tapered frusto-conical end walls 20, 22 connected to opposite ends of the cylindrical middle wall 18. The upper inlet 16A is defined at the top of the upper end wall 20 and the lower solids outlet 16B is defined at the bottom of the lower end wall 22. The lower gas outlet 16C is defined at a side of the lower end wall 22.

The auxiliary chamber 14 is defined by an elongated auxiliary hollow vessel 24 composed of a generally cylindrical wall 26 having opposite upper and lower open ends 26A, 26B communicating with the auxiliary chamber 14 which extends between them. The upper open end 26A of the auxiliary vessel 24 is connected to a duct 28 through which is supplied a solids-laden high temperature gas from any suitable source, such as an exhaust gas from an incinerator or other high temperature furnace. By way of example, the gas temperature at the upper end of the auxiliary vessel 24 can be up to 2500° F. The lower open end 26B of the auxiliary vessel 24 is connected to the upper inlet 16A of the main vessel 16. The auxiliary vessel 24 has a diameter larger than that of the supply duct 28 and smaller than that of the main chamber 12. For example, in one particular application, the diameter of the supply duct 28 is eight feet, the diameter of the auxiliary vessel 24 is twelve feet, and the diameter of the main vessel 16 is thirty feet. The auxiliary chamber 14 defined by the auxiliary hollow vessel 24, by having such size relationships to the supply duct 28 and the main chamber 12 of the main vessel 16, is capable of retarding or slowing the rate of flow of a molten solids-laden high temperature gas from the duct 28 through the auxiliary chamber 14 into the main chamber 12 of the main vessel 16. The slowed rate of gas flow serves to reduce generation of eddy currents in the main chamber 12 and to distribute the gas flow more uniformly in the main chamber 12. Consequently, the auxiliary chamber of the auxiliary vessel has open space, without any flow distribution device therein, for unencumbered gas flow without buildup of deposits therein.

Figure 3:
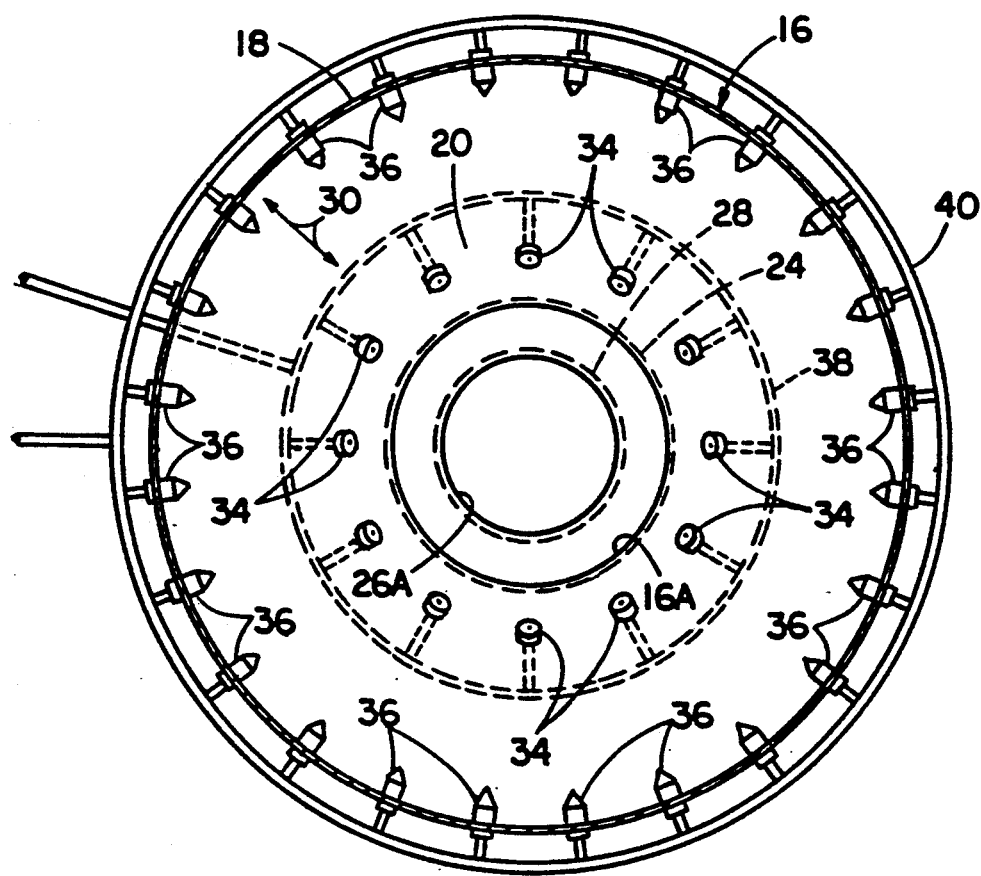
FIG. 3 is an enlarged transverse sectional view of a spray drying main vessel of the apparatus taken along line 3—3 of FIG. 2 showing a circumferential arrangement of first and second pluralities of atomizing spray nozzles located on the main vessel.

Referring to FIGS. 1-3, another feature incorporated by the spray drying apparatus 10 of the present invention is a bi-level pressure nozzle atomizing spray arrangement, generally designated 30, disposed in association with the main chamber 12 of the main vessel 16. The bi-level nozzle arrangement 30 is operable to atomize and spray the liquid with dissolved solids into the gas flow for disrupting the gas flow through the main chamber 12 such that a thorough mixing and uniform distribution of the gas flow and atomized sprayed liquid is achieved resulting in a complete evaporation and drying of solids from the mixture throughout the main chamber 12. The gases and some dry solids exit the main chamber 12 through the lower gas outlet 16C, whereas the dried solids, partially regasified, exit the main chamber 16 through the lower solids outlet 16. By way of example, the dried solids and gases flow to a bag collector facility (not shown), whereas the dried solids are deposited in an ash conveyor 32.

More particularly, the bi-level arrangement 30 includes a first plurality of atomizing spray nozzles 34 located at an upper level adjacent to the upper inlet 16A and a second plurality of atomizing spray nozzles 36 located at a lower level midway between the upper inlet 16A and the lower outlets 16B, 16C of the main chamber 12. The upper-level nozzles 34 are mounted to the upper end wall 20 of the main vessel 16 circumferentially spaced from one another and aligned in an inclined relationship to the generally downward direction of gas flow from the auxiliary chamber 14 to the main chamber 12. The lower-level, or midway, nozzles 36 are mounted to the middle wall 18 of the main vessel 16 circumferentially spaced from one another and aligned in a transverse relationship to the downward direction of gas flow through the main chamber 12. Further, the arrangement 30 includes upper and lower manifold rings 38, 40 mounted about the exterior of the main vessel 16 and connected to the respective bi-level upper and lower nozzles 34, 36. Under some conditions, the same liquid containing dissolved solids is supplied through both upper and lower manifold rings 38, 40 from a suitable source, such as a wet scrubber facility (not shown). Under other conditions, water is supplied through the upper manifold ring 38 to the upper nozzles 34, whereas the liquid with dissolved solids is supplied through the lower manifold ring 40 to the lower nozzles 36. The overall water balance desired in the main chamber 16 in the particular application determines whether water should or should not be supplied to the upper nozzles 34.

By way of example, there can be sixteen upper nozzles 34 and twenty-four midway nozzles 36. Preferably, the nozzles 34, 36 are the single fluid pressure atomization type which provides the best chance of being able to predict the droplet size produced by the nozzles. By controlling the gallons per minute of liquid flow to the nozzles 34, 36 and with knowledge of the pressure drop across the nozzles, the droplet size produced can be predicted very accurately. The droplet size influences greatly the ability to achieve drying of the solids in the mixture. The nozzles are selected to produce droplet sizes below a maximum, for example 300 microns and preferably in the range of from 75 to 100 microns, that will ensure 100% drying and thus avoid deposition of solids on the interior of the walls of the main vessel 16. As an example, the flow rate of liquid supplied to the nozzles 34, 36 can be from 125 to 200 gallons per minute. It should further be mentioned that the individual nozzles 34, 36 can be controlled so as to deliver different flow rates of atomized spray to the main chamber 12 or actually turned off to reduce the nozzles in operation. In such manner, the pattern of spray can be tailored to compensate for a lack of symmetry or uniformity in the gas flow through the main chamber. Also, where water is to be supplied through the upper nozzles 34, more upper nozzles 34 can be operated than lower nozzles 36.

The bi-level nozzle arrangement 30 provided in the main spray drying chamber 12 disrupts the gas flow at both the inlet 16A of the main chamber 12 and midway through the main chamber. Such disruptions of the gas flow provides more thorough mixing of the gas and sprayed liquid and distributes the gas flow more uniformly across the main chamber 12 and thereby distributes the evaporation and drying of solids from the mixture more uniformly throughout the main chamber. Such spreading of the evaporation process throughout the main chamber 12 enhances the completeness of drying attained in the main vessel 16 and substantially lessens the likelihood of deposit of solids on the walls of the main vessel 16.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. An apparatus for spray drying a mixture of a liquid and a high temperature gas containing molten solids, said apparatus comprising:
   (a) means for defining a spray drying main chamber;
   (b) means for defining a gas flow retarding auxiliary chamber upstream of said spray drying main chamber for retarding the rate of flow of gas into said main chamber such that the slowed rate of gas flow serves to reduce generation of eddy currents and to distribute the gas flow more uniformly in said main chamber, said auxiliary chamber being connected directly to a top inlet of said main chamber and having a diameter larger than that of a gas flow supply duct communicating with said auxiliary chamber and smaller than that of said main chamber and having open space, without any flow distribution device therein, for unencumbered gas flow without buildup of deposits therein; and
   (c) a bi-level atomizing spary nozzle arrangement disposed in said spray drying main chamber and being operable to atomize and spray liquid into the gas flow for disrupting the gas flow through said main chamber such that a thorough mixing and uniform distribution of the gas flow and atomized sprayed liquid is achieved resulting in evaporation of liquid and drying of solids from the mixture throughout said main chamber.

2. The apparatus as recited in claim 1, wherein said bi-level nozzle arrangement includes:
   a first plurality of atomizing spray nozzles located adjacent to a top inlet of said main chamber; and
   a second plurality of atomizing spray nozzles located midway between said top inlet and a bottom outlet of said main chamber.

3. The apparatus as recited in claim 2, wherein said nozzles in said first plurality are aligned in an inclined relation to a generally downward direction of gas flow from said auxiliary chamber to said main chamber.

4. The apparatus as recited in claim 2, wherein said nozzles in said second plurality are aligned in a transverse relation to a generally downward direction of gas flow from said auxiliary chamber to said main chamber.

5. The apparatus as recited in claim 2, wherein said nozzles in said second plurality are greater in number than said nozzles in said first plurality.

6. The apparatus as recited in claim 2, wherein said nozzles in said respective first and second pluralities are circumferentially spaced from one another about said main chamber.

7. An apparatus for spray drying a mixture of a liquid and a high temperature gas containing molten solids, said apparatus comprising:
   (a) an elongated main hollow vessel having an upper inlet and a lower outlet and defining a spray drying main chamber extending between said upper inlet and lower outlet;
   (b) an elongated auxiliary hollow vessel having opposite upper and lower open ends and defining an auxiliary chamber extending between said opposite ends, said auxiliary vessel at said upper open end being capable of connection to a gas supply duct and at said lower open end being connected to said upper inlet of said main vessel, said auxiliary vessel having a diameter larger than that of said supply duct and smaller than that of said main chamber for retarding of the rate of flow of gas from the duct through said auxiliary chamber into said main chamber in order to more uniformly distribute the gas in said main chamber, said auxiliary chamber of said auxiliary vessel having open space, without any flow distribution device therein, for encumbered gas flow between said upper open end of said lower open end without buildup of deposits therein; and
   (c) means on said main vessel for atomizing and spraying a liquid into said main chamber to cause mixing of the atomized liquid with the gas and thereby evaporating and drying of solids contained in the mixture of gas and atomized liquid to produce a dry powder capable of discharge through said outlet of said main vessel, said atomized and spraying means including a bi-level atomizing spray nozzle arrangement disposed in said spray drying main chamber and being operable to atomize and spray liquid, said bi-level nozzle arrangement including a first plurality of atomizing spray nozzles located adjacent to a top inlet of said main chamber and a second plurality of atomizing spray nozzles located midway between said top inlet and a bottom outlet of said main chamber.

8. The apparatus as recited in claim 7, wherein said nozzles in said first plurality are aligned in an inclined relation to a generally downward direction of gas flow from said auxiliary chamber to said main chamber.

9. The apparatus as recited in claim 7, wherein said nozzles in said second plurality are aligned in a transverse relation to a generally downward direction of gas flow from said auxiliary chamber to said main chamber.

10. The apparatus as recited in claim 7, wherein said nozzles in said second plurality are greater in number than said nozzles in said first plurality.

11. The apparatus as recited in claim 7, wherein said nozzles in said respective first and second pluralities are circumferentially spaced from one another about said main chamber.

* * * * *